Dec. 29, 1959 H. J. TROCHE ET AL 2,919,035
DERRICKS
Filed March 1, 1954 12 Sheets-Sheet 1

INVENTORS
HERMAN J. TROCHE &
GEORGE H. ECKELS
BY George W. Saywell
ATTORNEY

Dec. 29, 1959

H. J. TROCHE ET AL 2,919,035

DERRICKS

Filed March 1, 1954

*INVENTORS*
*HERMAN J. TROCHE &*
*GEORGE H. ECKELS*
BY

George W. Saywell

ATTORNEY

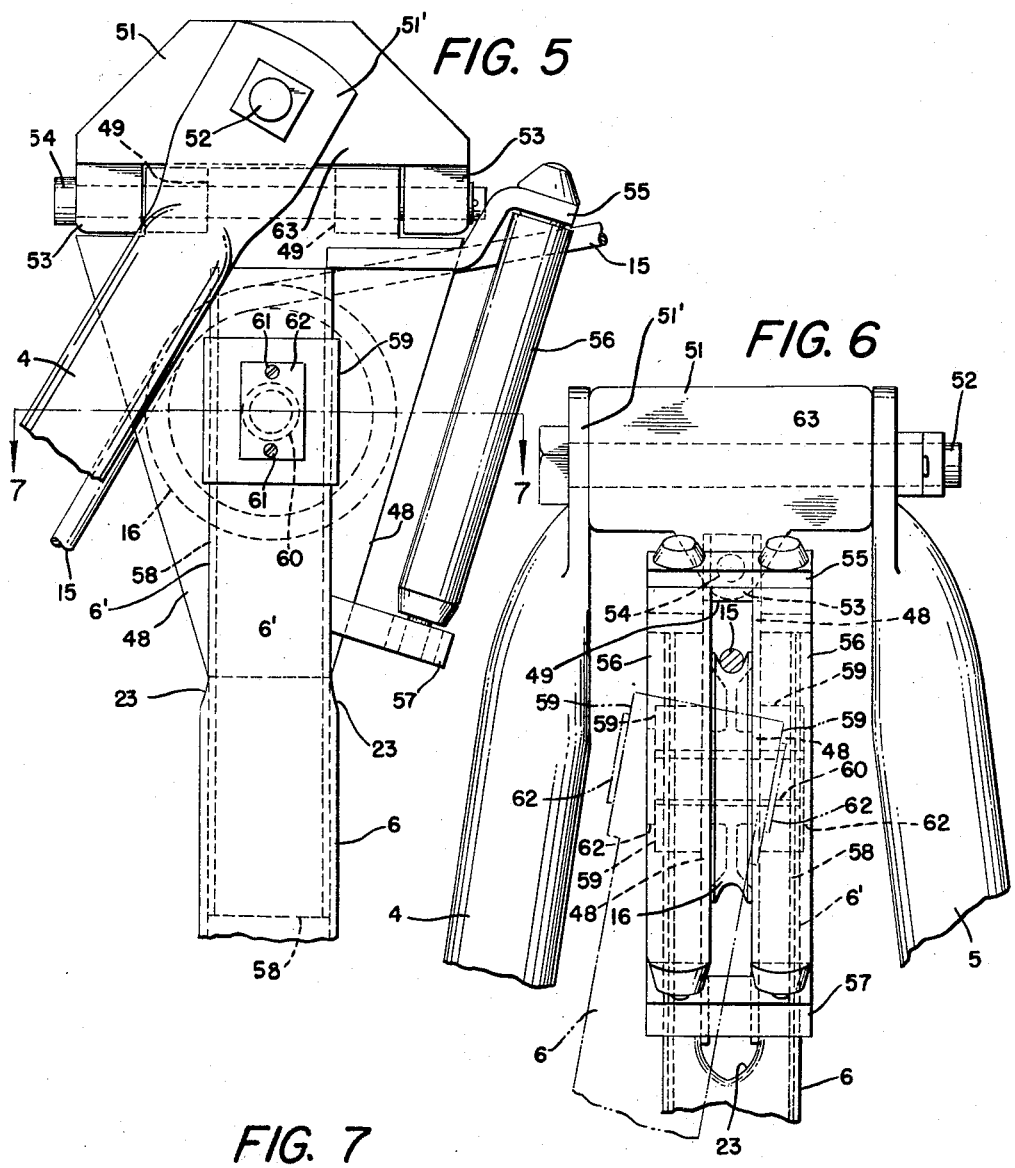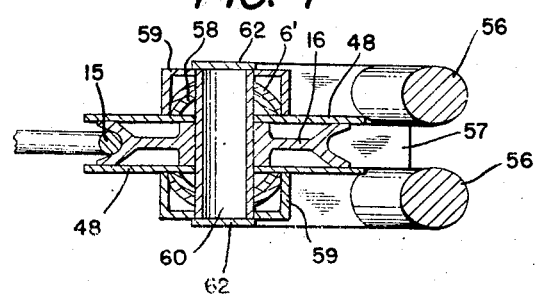

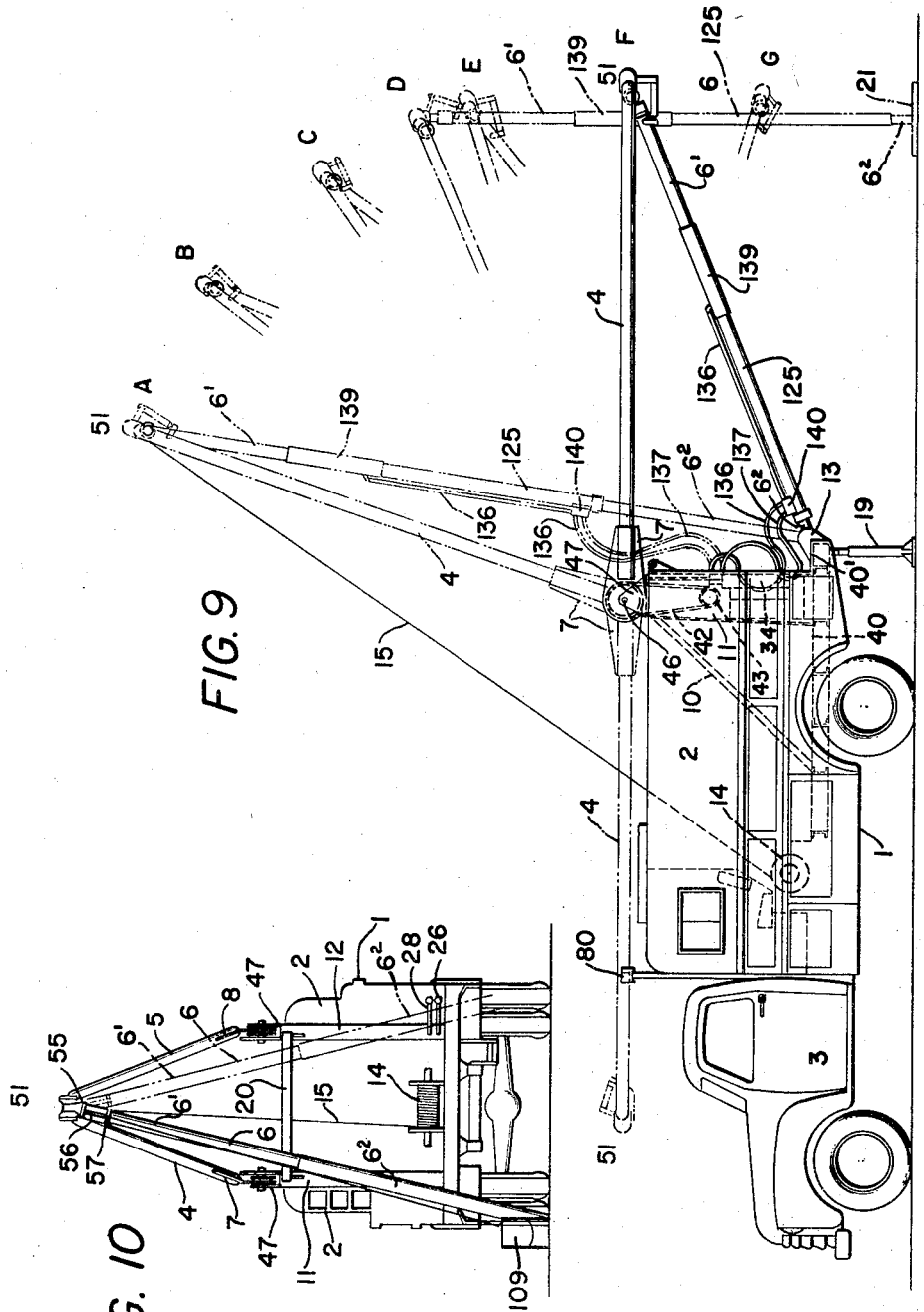

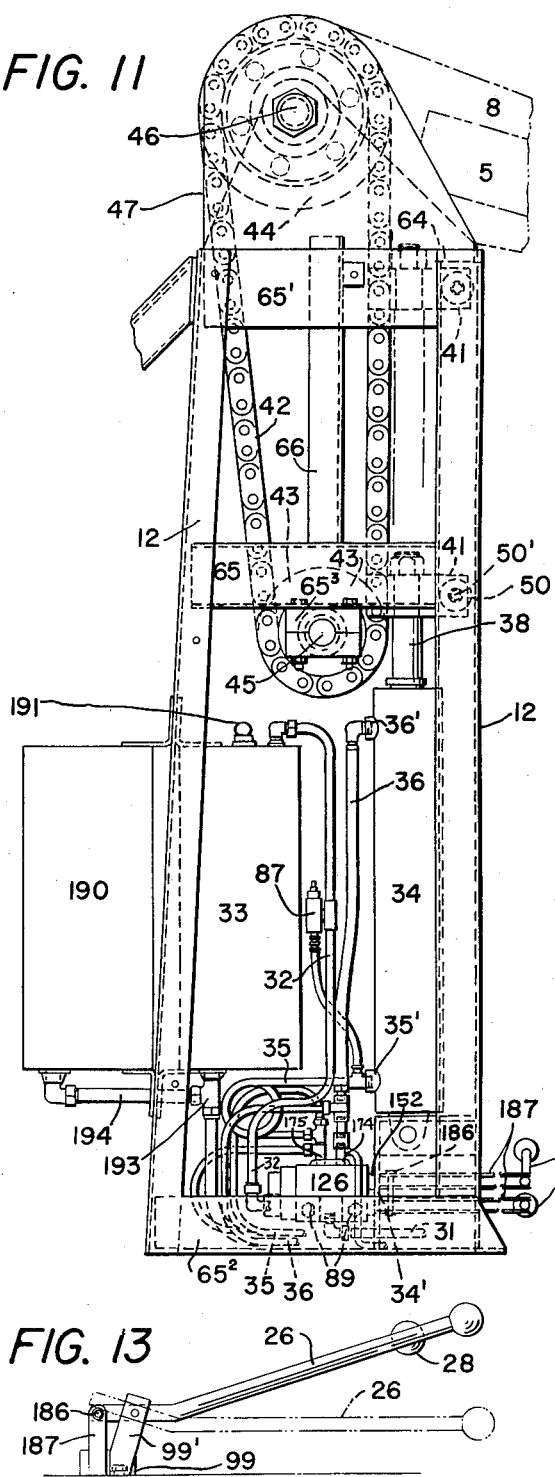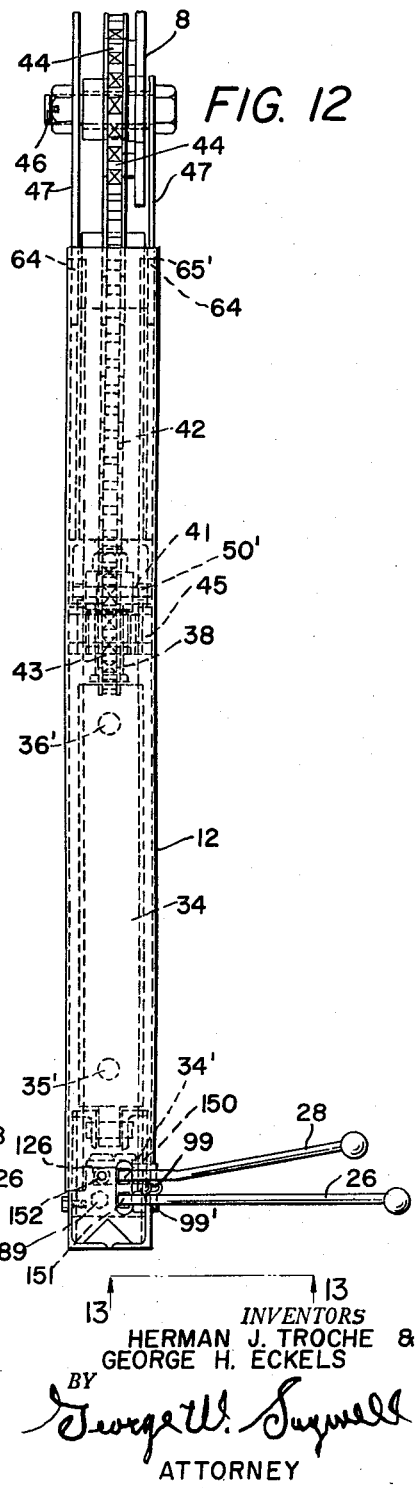

Dec. 29, 1959  H. J. TROCHE ET AL  2,919,035
DERRICKS
Filed March 1, 1954  12 Sheets-Sheet 6

INVENTORS
HERMAN J. TROCHE &
GEORGE H. ECKELS
BY
George W. Saywell
ATTORNEY

Dec. 29, 1959 H. J. TROCHE ET AL 2,919,035
DERRICKS
Filed March 1, 1954 12 Sheets-Sheet 7

INVENTORS
HERMAN J. TROCHE &
GEORGE H. ECKELS
BY
George W. Saywell
ATTORNEY

Dec. 29, 1959  H. J. TROCHE ET AL  2,919,035
DERRICKS

Filed March 1, 1954  12 Sheets-Sheet 8

INVENTORS
HERMAN J. TROCHE &
GEORGE H. ECKELS
BY
George W. Saywell
ATTORNEY

Dec. 29, 1959     H. J. TROCHE ET AL     2,919,035
DERRICKS

Filed March 1, 1954     12 Sheets-Sheet 9

*INVENTORS*
HERMAN J. TROCHE &
GEORGE H. ECKELS
BY
*George W. Saywell*
ATTORNEY

INVENTORS
HERMAN J. TROCHE &
GEORGE H. ECKELS.
BY
George W. Saywell
ATTORNEY

Dec. 29, 1959 H. J. TROCHE ET AL 2,919,035
DERRICKS
Filed March 1, 1954 12 Sheets-Sheet 11

INVENTORS
HERMAN J. TROCHE &
GEORGE H. ECKELS
BY George W. Saywell
ATTORNEY

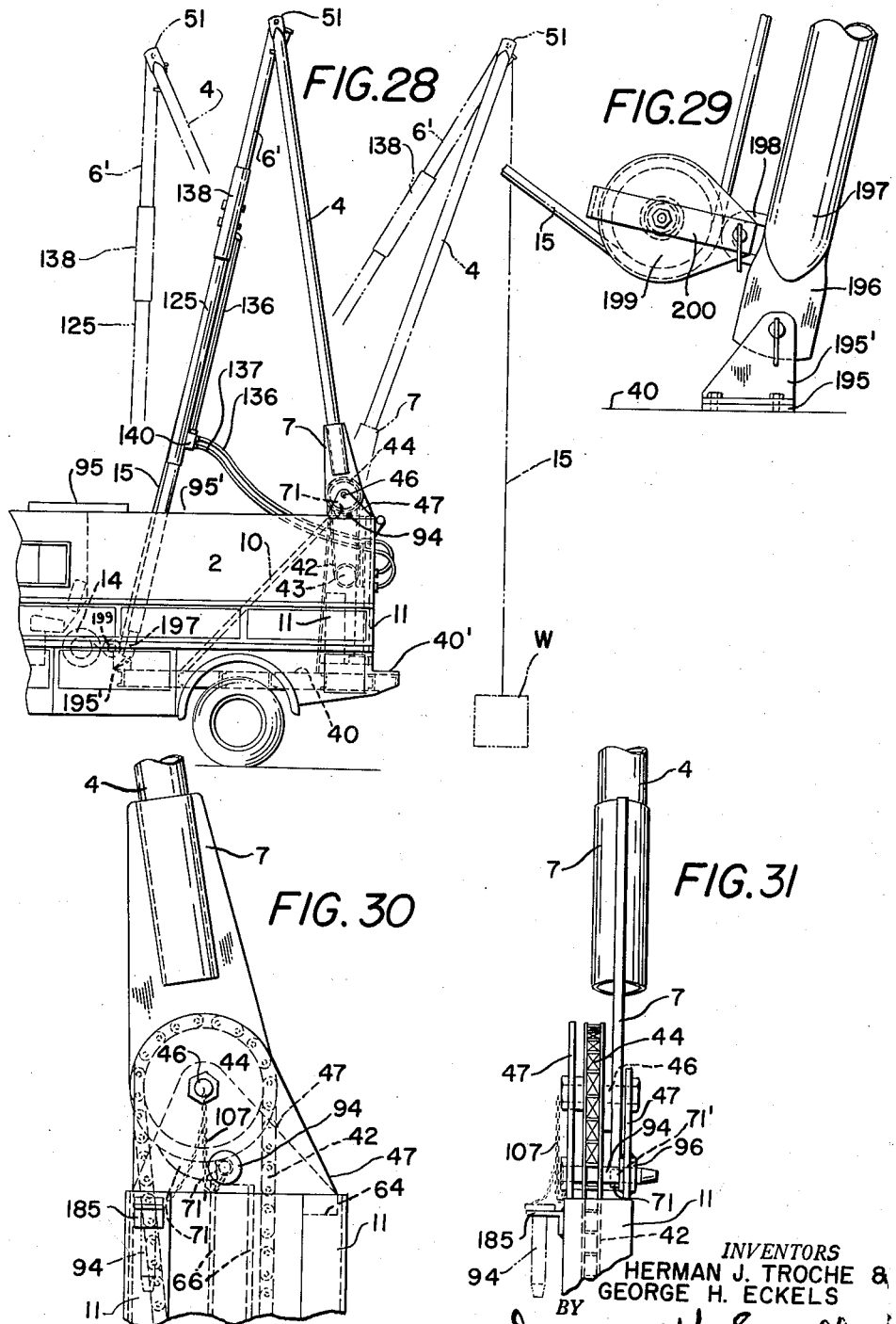

United States Patent Office 2,919,035
Patented Dec. 29, 1959

2,919,035

DERRICKS

Herman J. Troche and George H. Eckels, Fairview Park, Ohio, assignors to J. H. Holan Corporation, Cleveland, Ohio, a corporation of Ohio Application March 1, 1954, Serial No. 413,097

7 Claims. (Cl. 212—8)

The invention relates to derricks. Particularly, it relates to power-operated derricks having improved means of the pump and plunger type for raising and lowering a roller head pole derrick of the swivel or universal action type. Novel means comprising controlling mechanism for fluid power to enable the derrick to be adjusted and to perform various types of work are included in the invention.

The power medium is oil whose pressure and circulation are controlled by an assembly of operating handles, oil lines, pump, hydraulic cylinders, valves, and pressure equalizers shown in the accompanying drawings and hereinafter fully described and claimed.

Various features of the invention are shown and described as utilized in a rigid tripod type derrick and other features as utilized in a live boom derrick. The latter type of derrick is shown and described as having a separate control for a middle leg, a part of the control being an hydraulic cylinder forming a part of the middle leg. This type of derrick can be moved under load and has an indefinite number of working positions within its range.

A very important feature of the invention is that a center or middle leg is substantially permanently attached. The invention discloses a stiff center leg structure in a power-operated derrick. This stiff middle leg is automatically erected. It is not necessary to devise improvisations, or utilize temporary expedients, or execute special manipulations, in order to care for this middle leg during erection or to provide for the movements necessary to effect the functions required of the middle leg. This stiff leg structure is a part of both types of derrick, and is particularly serviceable in such operations as pole and stump pulling. Details of the structure and operation whereby this stiff center leg status is obtained in a power-operated derrick will be given hereinafter.

In addition to the universal action head improvements and the stiff leg structure, the invention discloses many other improved details and operating advantages amongst which will be particularly stressed, a supporting body top hinge, improved body loading of such objects as transformers and other heavy articles which must be lifted, and leg pin-holding means when assembling the derrick for operation. These and other improvements in structure and operation will be described in detail hereinafter.

The derrick structure itself for both the standard rigid tripod and live boom types is substantially identical although modified somewhat in structure and materially in mode of operation for the two types. Also each type within itself is modified and used differently for various operations. As hereinafter fully described upon reference to particular views of the accompanying drawings, these modifications and uses include various accessories and exchangeable elements and kits used discriminately, and various series of operations effected by the respective different assemblies.

For purposes of illustration only, the invention is described herein and shown in the accompanying drawings as supported on the body of a utility truck from which it is operated and upon the roof of which it is stored and transported. However, the improved derrick structure can be utilized on many other platforms or bases serving as derrick supports. A derrick of this general type, used on the body of a utility truck, under present practice, is most commonly stored in disassembled condition in a side compartment of a utility truck body. Such utility truck bodies and their equipment, including derricks, are utilized for many purposes, important amongst which is the installation and maintenance of the poles, line and other facilities of public utility companies.

This invention is, in part, directed to improved means for raising and lowering the derrick to and from desired operating positions relative to its stored position on the body roof.

Other parts of the invention are directed to the respective assemblages of derrick elements and power accessories essential to different types of work effected by the derrick, and to the methods of utilizing these assemblages for performing such different duties.

The annexed drawings and the following description set forth in detail certain means exemplifying the inventive structure and certain methods of utilizing such means, such means and methods constituting, however, only a few of the various forms in which the principle of the invention may be embodied, and only a few of the various series of steps by which various derrick operations may be effected.

In said drawings:

Figure 1 is a side elevation of a utility truck upon the body of which the improved derrick of the standard or rigid tripod type is mounted, a topmost operating position of the derrick being shown in full lines, five other working positions of the derrick being suggested in broken lines, one of them (D) showing a ground or stiff leg position of the center leg; a cable-threading lowermost position being also indicated. The storage position of the derrick on the roof the truck body is shown in the broken lines.

Figure 5 is a side elevation, upon an enlarged scale, of the derrick head in a working position, this view illustrating the special hinging of the head structure which permits universal action, the view showing the head of either the standard derrick or the live boom derrick since there is no difference in the structure of this part of the two types of derricks;

Figure 6 is a rear elevation of the elements shown in Figure 5, an angular position of the center leg of the derrick being also indicated by broken lines; angular positions of the center leg being utilized during derrick storage or for certain working operations of the derrick, such as some stiff center leg positions, and other positions such as illustrated in broken lines in Figure 4;

Figure 7 is a fragmentary plan section, taken from the plane indicated by the line 7—7, Figure 5;

Figures 1, 2, 3:
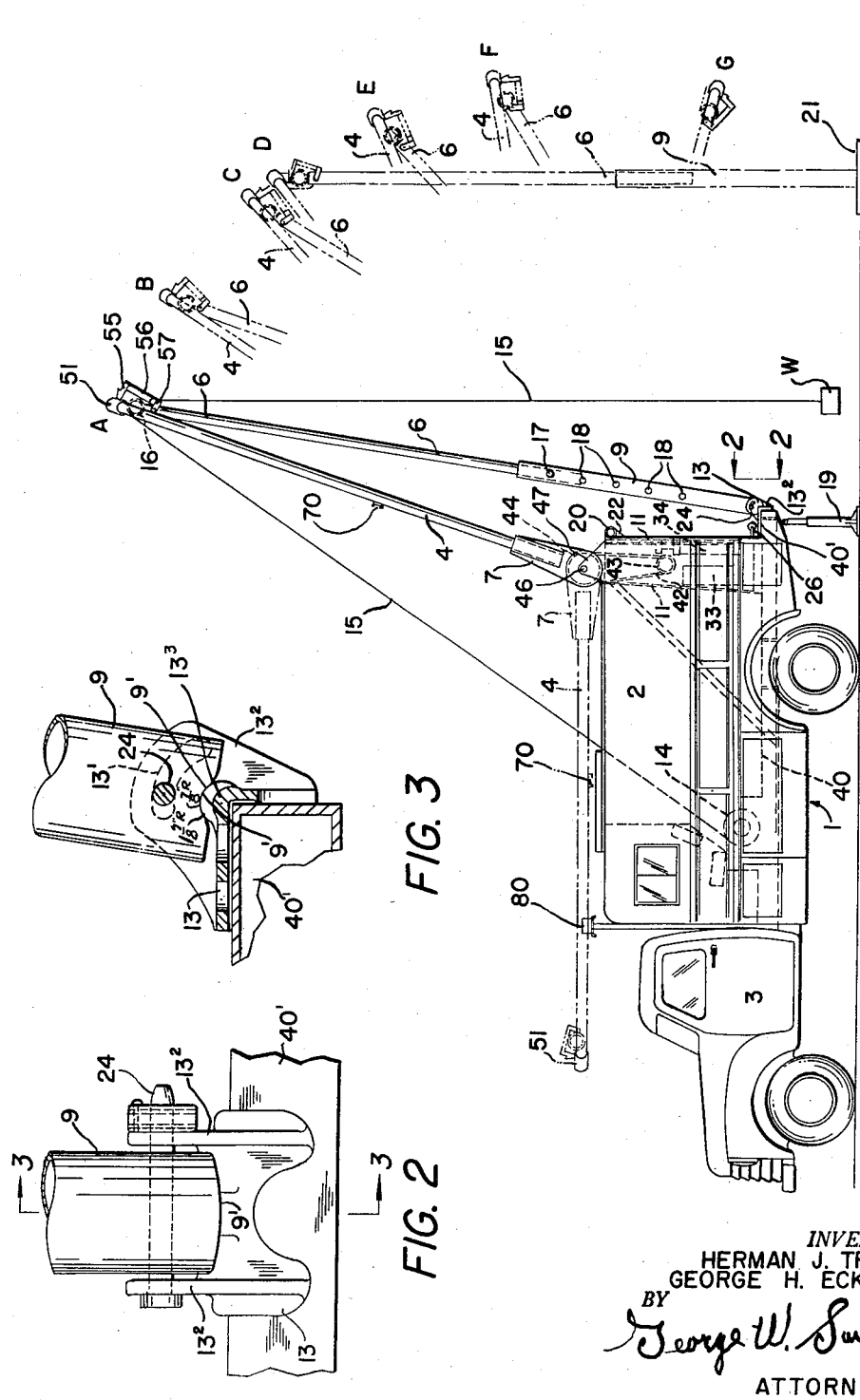
Figure 2 is a fragmentary rear elevation upon an enlarged scale, taken from the plane indicated by the line 2—2, Figure 1, showing a removable rear centrally-located adapter anchor bracket for the center leg of the derrick.
Figure 3 is a longitudinal vertical section of the elements shown in Figure 2, taken in the plane indicated by the line 3—3, Figure 2.
Figure 4:
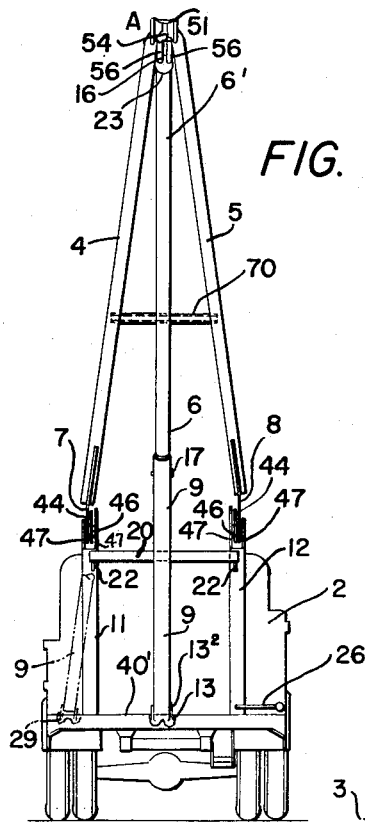
Figure 4 is an elevation from the rear of the truck of Figure 1 and shows the derrick in the top-most working position illustrated in Figure 1, the view also showing in broken lines a shifted side position of the derrick center leg for a special type of derrick operation hereinafter fully described.
Figure 8:
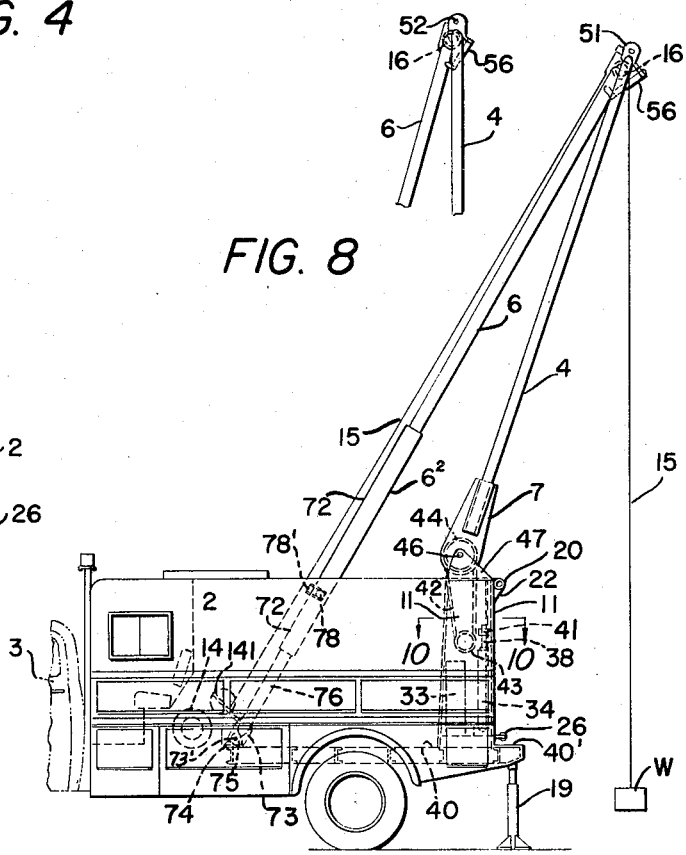
Figure 14:
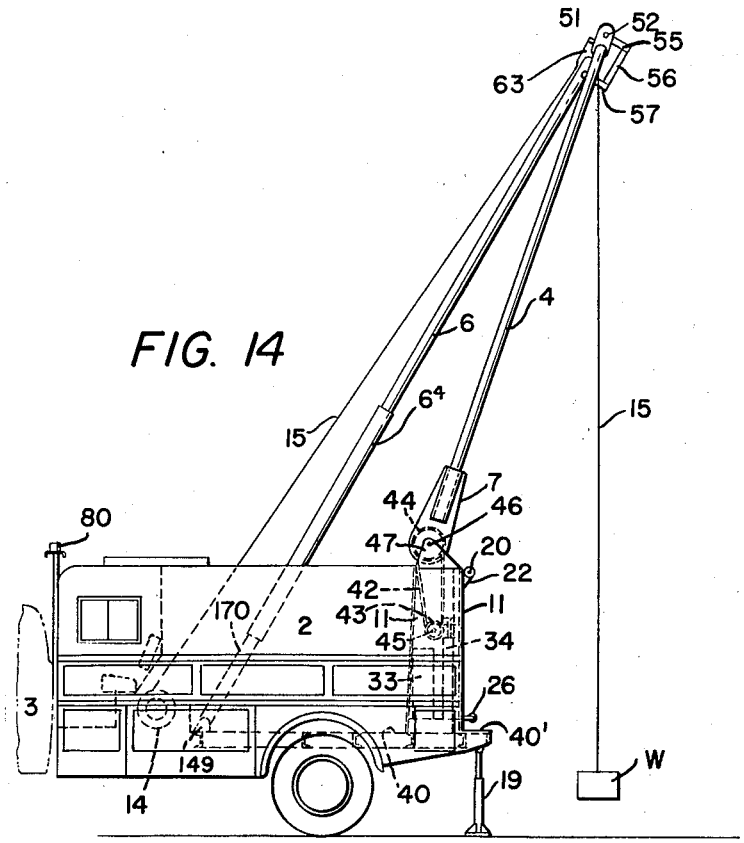

Figure 8 is a left side view of a utility truck body showing an assemblage of elements of the derrick of standard type mounted thereon suitable for on-and-off platform loading, in which operation the center leg is shifted forwardly and attached to a bracket mounted in the forward part of the body, and a center leg extension is utilized, the bracket being substituted for the center leg rear anchor bracket shown in Figures 2 and 3, this assemblage of Figure 8 being used with the derrick head having a maximum travel of about six feet;

Figure 9 is a side view of a live boom derrick mounted on a utility truck body, and showing a horizontal working position in full lines and suggesting five other working positions, one of them (D) being a ground-engaging position, in which the center leg is a stiff member, this live boom type of derrick having separately-controlled auxiliary power means to effect adjustments of the center leg, such as a double-acting hydraulic cylinder forming part of the center leg, oil lines therefor, and a modified type of control valve. A cable-threading lowermost position of the derrick is also indicated in this figure;

Figure 10 is a rear elevation of a truck body showing a position of the derrick center leg at an angle to the longitudinal center line of the truck, for instance, twenty degrees, a position oftentimes most suitable for stump or pole pulling. This is a position the center leg can take due to its pivotal mounting for possible lateral movement as illustrated in Figures 4 and 6;

Figure 11 is a vertical section, of the live room type of derrick, upon an enlarged scale, taken from inside the rear portion of the truck body shown in Figure 9, looking toward the right side of the body;

Figure 12 is a rear elevation of the elements shown in Figure 11;

Figure 13 is a bottom plan view taken from the plane indicated by the line 13—13, Figure 12, particularly showing the handles for moving certain spools or plungers mounted in the control valve for the live boom type of derrick;

Figure 14 is a side elevation of the standard type of derrick showing the center leg mounted forwardly in the truck body and in the center thereof for the lifting of heavy loads to an elevated floor to the rear of the platform 40', this assemblage including a certain adapter kit hereinafter fully described.

Figure 15:
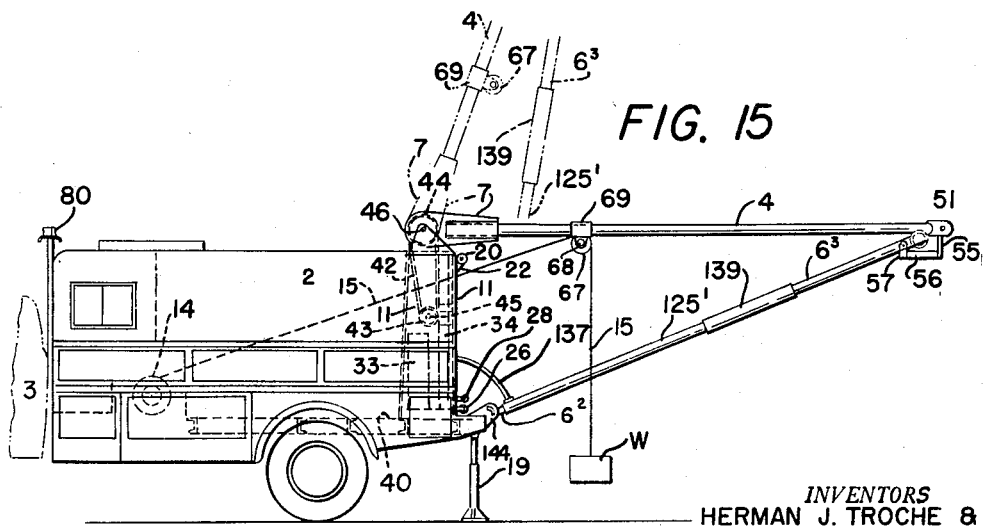
Figure 16:
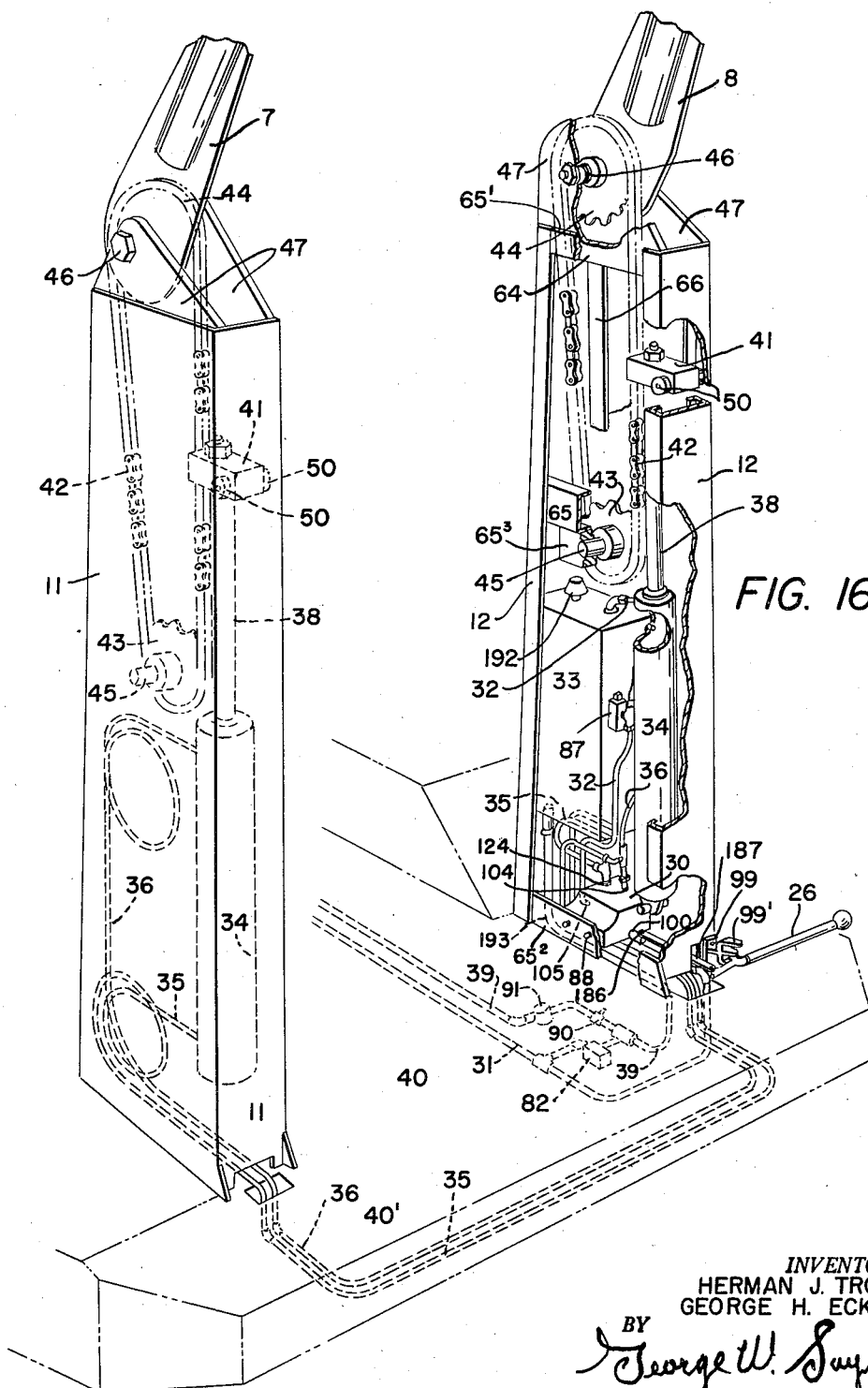
Figure 17:
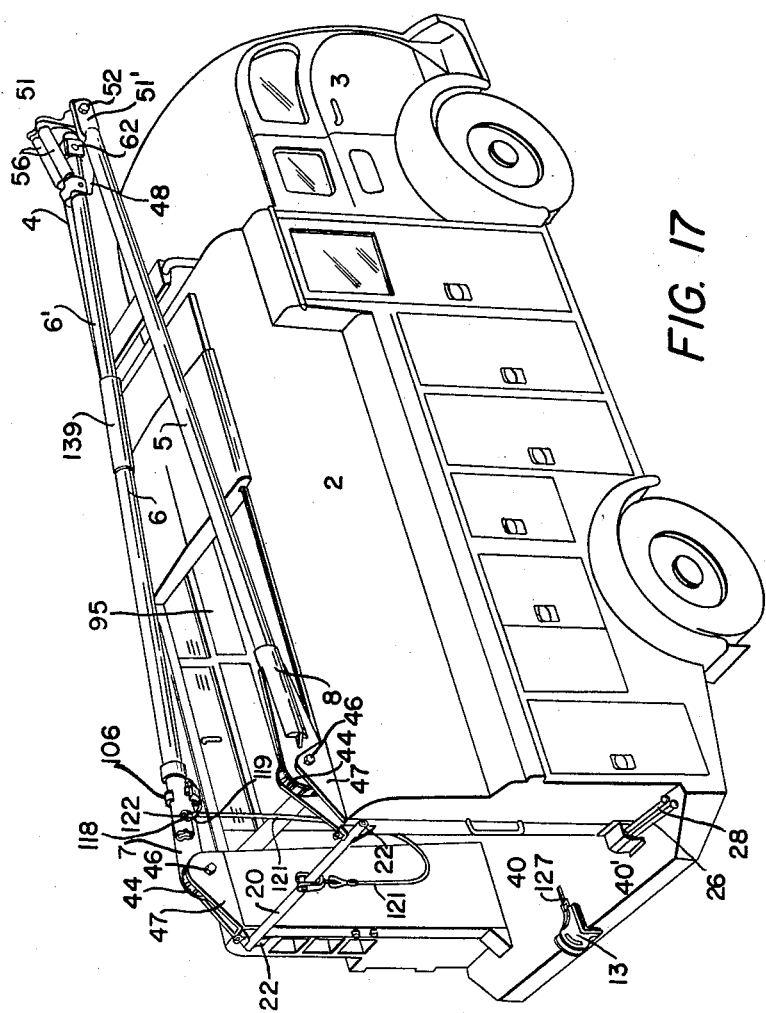
Figure 20:
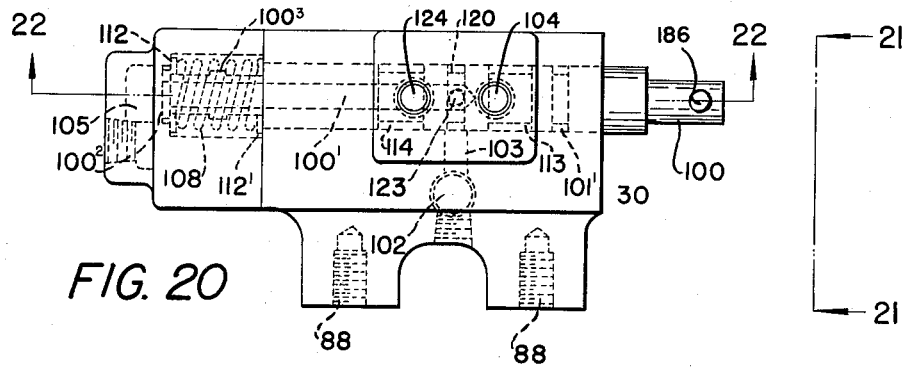
Figure 22:
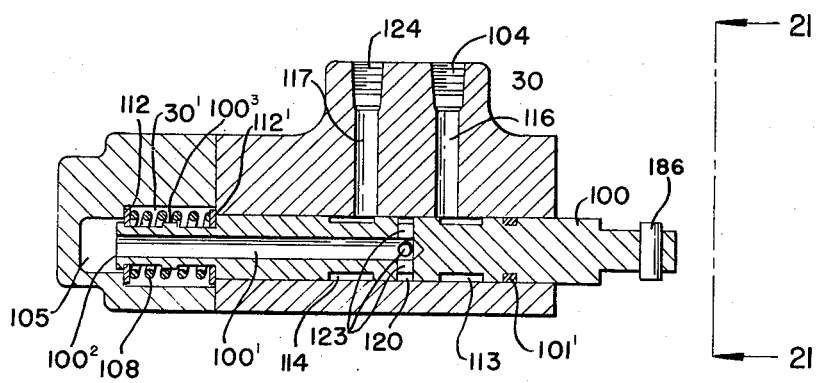
Figure 21:
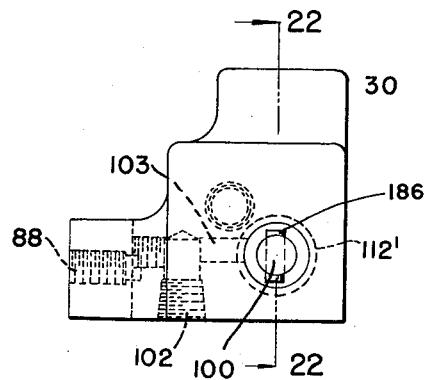
Figures 23, 24:
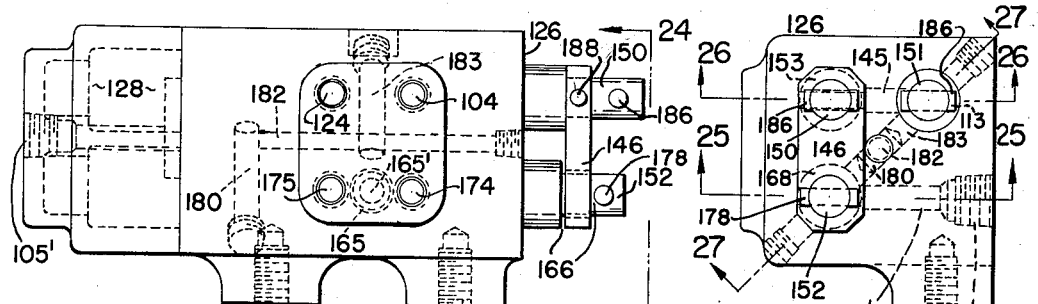
Figure 25:
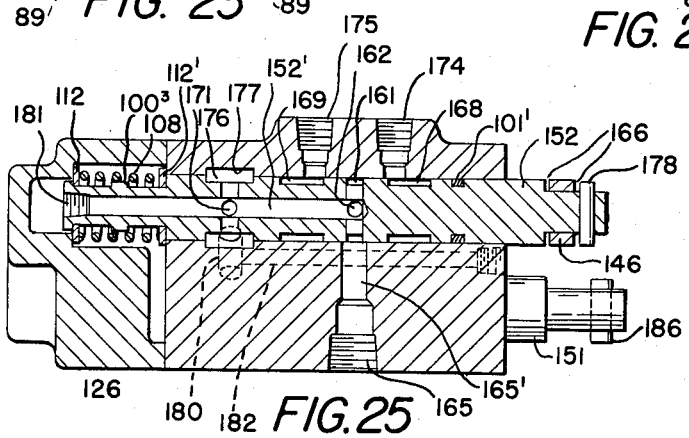
Figure 26:
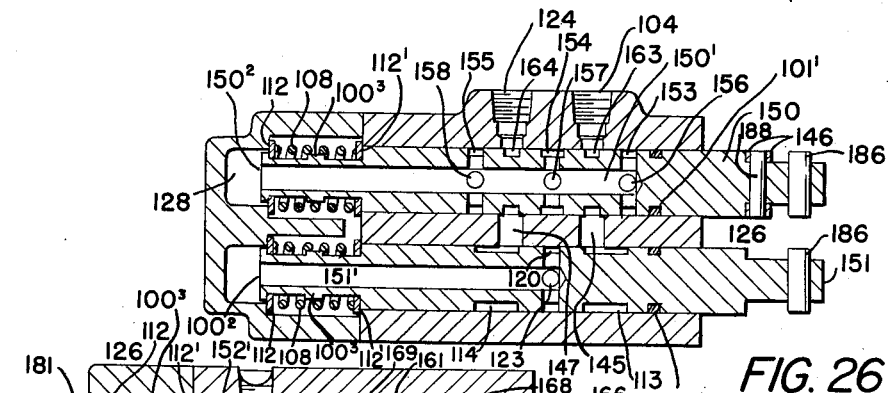
Figure 27:
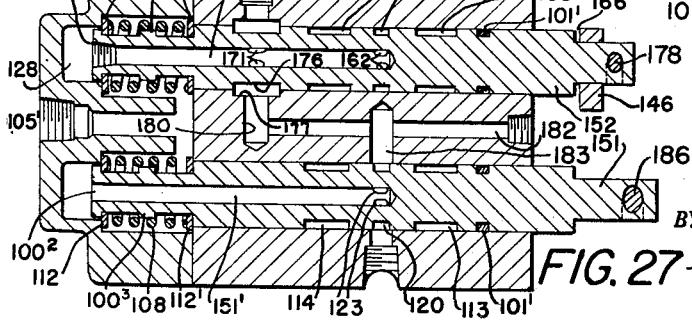

Figure 15 is a side elevation of the live boom type of derrick showing the hydraulic cylinder center leg shifted to the left side of the rear platform of the truck for use of the derrick in a davit type operation through 70° of travel. This operation is effected with the aid of an auxiliary sheave bar and associated elements, the horizontal working position for this operation being shown in full lines and other working positions suggested by broken lines;

Figure 16 is a perspective view, from the left side, of the rear end of a truck body having mounted thereon the lifting and lowering mechanism for erection and storage of the derrick of standard type, the oil lines and accessories being suggested, and the lower end of the derrick side legs being shown in about the highest working position thereof;

Figure 17 is a perspective view, from the right side, and from the rear, and from above, of a truck body with a derrick of the live boom type stored on the body roof;

Figure 18 is a piping diagram showing the oil flow and the control valve for operation of the standard rigid tripod type of derrick;

Figure 19 is a piping diagram showing the oil flow and the control valve for operation of the live boom type of derrick;

Figure 20 is a plan view of the valve employed to control the flow of oil in the standard derrick operation;

Figure 21 is a rear end elevation taken from the plane indicated by the line 21—21, Figures 20 and 22;

Fig. 22 is a vertical section taken in the plane indicated by the lines 22—22, Figures 20 and 21, looking toward the right side of the valve;

Figure 23 is a plan view of the valve employed to control the flow of oil in the operation of the live boom type of derrick;

Figure 24 is a rear end elevation taken from the plane indicated by the line 24—24, Figure 23;

Figures 25, 26, and 27 are vertical sections taken respectively in the planes indicated by the lines 25—25, 26—26, and 27—27, Figure 24;

Figures 28, 29, 30, and 31 illustrate the positioning and functioning of certain holding pins for the improved derrick when it is being prepared for loading a burden onto the working floor of a truck body through an opening in the body roof, of which figures, Figure 28 is a broken side view of the left side of a truck body with a derrick mounted thereon in substantially vertical position, the load pick-up and load-depositing positions being suggested in broken lines;

Figure 29 is a fragmentary enlarged elevation of the anchorage for the center leg forwardly on the working floor of the truck body;

Figure 30 is a fragmentary, enlarged elevation of a derrick side leg and its mounting, with the side leg in substantially vertical position of the derrick, the view particularly showing a derrick-holding pin inserted when the derrick is in substantially vertical position and the center leg is being extended to provide suitable length for the desired loading operation, the center leg cylinder being non-effective at this time for holding the derrick from falling; and Figure 31 is a right side elevation of the elements shown in Figure 30.

It may be stated, as a general introduction to the invention presented by the description and drawings, that it includes a power-erected derrick whose work is performed by a winch line, Figures 1 and 4, for instance;

A power-erected derrick having also a power-actuated telescoping center leg cylinder, forming part of the center leg and serving to effect the adjustments of the latter to perform the working operations of the derrick, this center leg cylinder being either single acting, Figure 15, or double acting, Figure 13, for instance.

A control valve for the oil pressure used in the winch-operated derrick, this valve having a reciprocable plunger which with certain valve ports and oil lines controls oil flow to the supporting legs of the derrick for derrick erection and lowering, Figures 20, 21 and 22;

A control valve for the oil pressure used in the derrick types having a center leg cylinder, this valve having three reciprocable plungers which serve respectively for erection and lowering of the derrick, adjustments of the center leg, and an equalizing plunger linked to the center leg adjusting plunger. These plungers with certain valve ports and oil lines control oil flow for all derrick operations, Figures 23 to 27, inclusive, for instance;

A fixed derrick head for all the types of derricks which provides universal swiveling movements between erection and supporting derrick legs and an adjusting working leg, Figures 5 and 6, for instance; and Certain adapter additions or rearrangements which serve for special operations, Figures 8, 14, and 15, for instance.

Referring to the annexed drawings in which the same elements are designated by the same respective numbers in the several views, and first referring particularly to Figures 1 to 7, inclusive, and 14, and 16, in which a standard tripod type of derrick is shown as assembled for usual operation from the rear of a truck body, a utility truck 1 has a body 2 and a cab 3, Figure 1, of which the body 2 provides a support for mounting, storing and operating the derrick, the latter comprising upwardly converging side legs 4 and 5 and an extensible center leg 6 depending from the side legs. The derrick legs 4, 5 and 6 are shown as tubular and all of them are normally pivotally connected at their lower ends to and adjacent the rear of the body 2, the side legs 4 and 5 at about body roof level, and the center leg 6 at about the level of the working floor 40 of the body 2. When the derrick is not in use it is stored above the body roof, as shown in broken lines in Figure 1, and rested on a locking front support 80. In this stored position the center leg 6 is in telescoped condition at its lower end and is pulled over against the left side leg 4 and fastened adjacent its lower end in a holddown bracket 106, Figure 17.

Certain structural features of a roller type fixed derrick head, with universal action, Figures 5 and 6, and the functioning of these head features during the raising and lowering, and during the working operations of the derrick, are a part of the instant invention and will be described in detail hereinafter.

The actual work effected by this standard type derrick is carried on by winch line 15 playing around a drum of a winch 14 mounted in the body 2 adjacent the forward end of its working floor 40, the line 15 thence passing to and traversing a sheave 16, Figures 5 and 6, forming part of the derrick head and rotatably mounted in concentric upper extensions 6′ and 58 of the center leg 6, the line 15 thence passing to the work.

The side legs 4 and 5 are rigidly secured at their lower ends in sockets 7 and 8, respectively, Figures 1 and 16, which are pivotally mounted on pins 46 supported by plates 47 erected on side channels 11 and 12 at about body roof level. These side channels 11 and 12 are erected on the floor 40 inwardly of and adjacent the rear of the side walls of the body 2 and are extended upwardly to about body roof height. The side legs 4 and 5 are connected together by a cross brace 70.

The center leg 6 has a telescoping lower section 9, Figures 1, 2, 3 and 4, which can be removably pivotally secured adjacent its lower end by a pin 24 in upwardly-projecting arms 13² of a bracket 13, Figures 2 and 3, secured to the central rear edge portion of the rear platform 40′ of the working floor 40 of the body 2, the ends of the pin 10 being mounted in arcuate slots 13′ formed in the bracket arms 13², whereby the center leg 6 has longitudinal pivotal movements relative to the floor level of the truck body 2.

The body 2 is provided for unusually heavy work, with a support jack 19 pivoted at its upper end to the rear of the under frame of the body 2, and with a transverse sheave bar 20 removably pinned in brackets 22 secured to the rear side surfaces of the body 2 at about roof level, Figures 1 and 4.

The raising and lowering of the derrick are effected by hydralift action based on oil pressure. The mechanism herein shown for this work includes a hydraulic pump 25, Figure 18, mounted on the body frame and actuated to "In" and "Off" positions by engine power take-off 27 controlled from the cab 3 by a lever (not shown), all as will be hereinafter fully described in detail.

The top ends 51′ of the derrick side legs 4 and 5 are flattened and secured to a cross pin 52 mounted in a bracket 51, the legs 4 and 5 being pivotally movable relatively to the bracket 51 for movement of the legs 4 and 5 in a plane parallel to the plane of the truck 1. The top of the upper center leg section 6′ is pivotally mounted on a longitudinal hinge pin 54 extended relatively right angularly to the pin 52 to permit transverse movement of the center leg 6. The structure incorporating the transverse pivotal mounting of the side legs 4 and 5 with the longitudinal pivotal mounting of the center leg 6 is as follows. The pin 54 is mounted in a series of hangers, some (53) depending from the bracket 51 and others (49) upwardly projected from vertical plates 48 of triangular formation, Figures 5, 6, and 7, forming part of the derrick head and hereinafter fully described. These hangers are four in number, a forward end and rear end pair 53 which depend from the bracket 51 and respectively adjacent an intermediate pair 49 upwardly projected from the plates 48. Thus, the legs 4 and 5 and the leg 6 have relative movements in a longitudinal direction relative to the truck body and the center leg 6 has a transverse movement relative to the side legs 4 and 5, thus providing universal action. The bracket 51 has a snubbing action on the inside faces of the upper ends 51′ of the side legs 4 and 5 so that there is no free longitudinal swinging of the center leg 6 on the pin 52. Between the opposed inside faces of the plates 48 and adjacently below the hangers 49 and 53 is a strengthening plate 63, Figure 6. The entire derrick head includes other elements down to the plane defining the bottom of the plates 48, which elements will now be described.

Adjacent its top, center leg 6 receives the lower end of an inner and abutting tube section 58 which interiorly abuts an upper center leg section 6′ which is cut away on its front and rear sides from its bottom end up, as indicated by 23, Figures 5 and 6. The section 6′ and tube 58 extend upwardly to the same horizontal plane and the tube 58 is welded at the top to the leg section 6′. The tube section 58 is also correspondingly cut away from the plane 23 upwardly. The cutaway areas of the center leg section 6′ and tube 58 provide for the insertion and accommodation of the sheave 16 and also an opposed pair of the triangular plates 48 which abut the two faces of the sheave 16, Figure 7. The front and rear edges of the plates 48 converge downwardly to a position abutting the exterior surface of the leg section 6′ at substantially the lower plane 23 of its cutaway portions, and extend upwardly to a horizontal plane adjacent the bottom of the bracket 51.

Abutting the outer faces of the plates 48 by inwardly-extended flanges are two spaced channel formations 59, Figures 5 and 7, within whose webs are seated the ends of a spindle 60 upon which the sheave 16 rotates between the opposed inside faces of the plates 48. The ends of the spindle 60 are covered by plates 62 secured by set screws 61 to the channel formations 59. The channel formations 59, the leg section 6′, the tube 58, and the plates 48 are drilled for accommodation of the spindle 60.

Rotatably mounted at their upper and lower ends in forwardly-extending brackets 55 and 57 secured at their front ends to the rear side of center leg section 6′ are spaced offset downwardly-inclined rollers 56, the plane of the sheave 16 lying between these rollers 56 so that any pull upon the winch line 15 materially laterally of the center longitudinal plane of the derrick will cause the line 15 to engage one or the other of these rollers 56 and thus eliminate drag upon the line 15 which might result from the offset nature of the work being performed.

When the derrick is stored on the top of the truck body 2, as shown in broken lines in Figure 1, the center leg 6 is pulled over on the longitudinal pin 54, as illustrated in Figure 6, against the left side leg 4, whereby the center leg 6 does not impede loading or unloading or any other operations it is desired to carry out in the truck body. This lateral positioning of the center leg 6 also provides room for equipment which extends upwardly beyond the stored derrick level. For certain derrick operations, hereinafter fully described, the center leg 6 is also shifted laterally against one or the other of the side legs 4 and 5, and pivotally mounted at its lower end on a special anchor block forming part of adapter elements.

By a piping system and accessories hereinafter fully described the working oil flow is through a control valve 30 and then to and from the two ends of double acting cylinders 34 through lines 35 and 36, Figures 16, and 18. The ports 35′ and 36′ in the cylinders 34 respectively at the bottom and top of the latter are of a fixed size to control the flow of oil whereby the derrick raising and lowering is a controlled speed operation. Cylinders 34 have pistons 37 and piston rods 38. The latter are secured adjacent their outer ends to endless roller chains 42, Figures 1, and 16, by and centrally of blocks 41, which at their inner ends are secured to reinforced links of the chains 42. The chains 42 engage the lower sprockets 43 and upper sprockets 44 rotatably mounted on respective pins 45 and 46 mounted respectively in journal boxes 65³ depending from intermediate channel braces 65, and in the brackets 47, Figure 16. The ends of a vertical channel 66 are secured to the intermediate longitudinal braces 65 and upper braces 65' of the side channels 11 and 12. The upper pins 46 also serve for the pivotal mounting of the sockets 7 and 8 for the derrick side legs 4 and 5. The bottoms of the spaced side channels 11 and 12 are also braced by longitudinal angles 65². The rear or outer ends of the blocks 41 are intersected by pins which at their ends rotatably carry rollers 50 which travel on the inside faces of the inner flanges of the channels 11 and 12 as the chains 42 are moved upwardly and downwardly.

Six derrick working positions are suggested in Figure 1, viz., "A," "B," "C," "D," "E," and "F," of which position D is a ground-engaging position for the center leg 6, the side legs 4 and 5 for this ground-engaging operation being moved slightly downwardly from position "C" in the illustrative positions shown. When center leg 6 is in ground-engaging position D, it rests upon a ground plate 21. This is a stiff leg position for pulling poles, stumps, etc., and will be referred to hereinafter more in detail. Position "G" is a lowermost position, which allows the derrick to be reached from the ground whereby the winch line 15 can be threaded through the top of the derrick. When this is done, the bottom end of the middle leg 6 must be directed either on top of the truck body or beneath it. The threading of the winch line 15 can also be effected by leaving the center leg 6 clamped in storage position against the left side leg 4.

To elevate the derrick of standard type, the power takeoff 27, Figure 18, is actuated to "In" position to start the hydraulic pump 25. Then the sheave pivot bar 20, Figures 1 and 4, is mounted and securely pinned in position on brackets 22. Next the center leg 6 is released from the side leg 4 and swung over into the center line of the truck. Then by suitable actuation of an operating handle 26, Figure 16, controlling oil ports and passages in a control valve 30, Figures 18, 20, 22, and 23, oil passes from pump 25 to and through the lines 36 to the tops of the cylinders 34 and the derrick is raised by the clockwise movement of the chains 42. The derrick will not fall too fast after it passes a vertical position since the ports 35' from the bottom of the cylinders 34 to the lines 35 are restricted, i.e., so sized that the oil cannot pass from cylinders 34 any faster than to permit an easy controlled descent of the derrick. During this derrick-raising operation the center leg 6 dangles vertically from the derrick head. The center leg lower section 9 whose bottom end is rested upon the ground is then telescoped into proper position from about derrick position G, Figure 1, and fastened by pin 17 in proper heighth hole 18, Figure 1, for the desired operating position, A, B, C, D, E, or F, Figure 1. Unless the derrick is going to be used with the center leg 6 as a stiff leg, i.e., seated on the plate 21 at ground position D, the lower center leg section 9 is now piloted into position in the bottom truck bracket 13 and fastened by the pin 24. The derrick is now ready for use by means of winch 14 and winch line 15.

If the derrick is being used in position "A," "B," or "C," before it is to be used in ground position "D," to place it in ground position "D" the center leg section 9 is released by removing pin 24 and guided down to foot plate 21 while lowering the derrick with the hydraulic control. In the illustrated positions shown, only a slight lowering of the derrick is required, if the previous use had been in position "C." If the previous use of the derrick had been in position "E" or "F" before it is desired to place it in ground position D, the derrick would be suitably raised before guiding it down to the foot plate 21.

For retracting the derrick to storage position on the roof of the body 2 or for any lifting of the derrick, a reverse order of operations applies, with the chains 42 moving in a counterclockwise direction, the restricted cylinder ports 36' preventing a too rapid lowering after the derrick passes forwardly beyond a vertical plane.

The piping and accessories assembly for the rigid tripod derrick previously described comprise, Figure 18, the two-port valve 30 with its inlet port 102 and its return port 105, valve 30, the high pressure line 31 thereto from the pump 25, the two lines 36 from the valve 30 to the tops of the double acting cylinders 34, the two lines 35 to the bottom of the cylinders 34 from the valve 30, the line 32 from the valve 30 to the oil reservoir 33, and the line 39 back to the pump 25 from the reservoir 33. Check valves 85 and 86 are in lines 111 and 115 connected with the tops and bottoms respectively of cylinders 34 and these lines 111 and 115 communicate with line 110 which carries a relief valve 87 and communicates with reservoir return line 32. The pump return line 39 carries a shutoff valve 90 and an oil strainer 91. A relief valve 82 communicates with the high pressure line 31 and the pump return line 39 adjacent the pump end of the system. Suitable accessories are provided, such as a universal joint assembly 92 between the power takeoff 27 and the pump 25, and an operating connection 93 between the high pressure line 31 and an hydraulic throttle control (not shown) actuated by the oil pressure in the hydraulic system, which throttle control opens the truck engine throttle when the handle 26 is actuated.

As clearly appears in Figures 2 and 3, the lower center leg section is formed at its lower edge 9' to roll on a knob 13³ of the anchor bracket 13 and for suitable accommodation of these longitudinal movements of the derrick the radius of the rolling edge 9' is markedly of greater dimension at the ends of the contacting surfaces than is the center radius. For instance, a ⅞" radius at the center and a 1⅞" radius at the ends have been found suitable.

For the live boom derrick structure, a telescoping hydraulic cylinder is utilized which forms a part of the center leg 6 and permits the necessary adjustments of that leg. This cylinder communicates with a control valve 126 through oil lines 136 and 137 and valve ports 175 and 174, Figure 19. The valve also has derrick erection ports 104 and 124, Figure 19. The hydraulic cylinder forming part of the telescoping center leg 6 may be either single acting or double acting. In Figure 15 a single acting cylinder 125' is shown so that the oil enters and leaves the same end thereof and the valve controlling the oil flow to and from this cylinder and to the two cylinders 34 for the side legs 4 and 5 is a three port structure. For most of the uses of the center leg cylinder shown and described herein the cylinder is a double acting one, "125," and the valve 126 controlling the functioning of the same and the two cylinders 34 for the side legs 4 and 5 is a four port valve communicating with the two ends of the double acting cylinder 125 through oil lines 136 and 137 and valve ports 175 and 174, respectively.

As hereinafter fully described the pistons 37 of the double acting cylinders 34 are free to float when the center leg 6 of the live boom type of derrick is being adjusted through the extending or telescoping of the cylinder 125. Thus the derrick can be elevated under load and this is called live boom action.

The elements constituting the oil path for the live boom type of derrick include, Figure 19, the lines 36 and 35 to the respective tops and bottoms of the cylinders 34, the restricted cylinder ports 36' and 35', lines 111 and 115, check valves 85 and 86, valve 126, an inlet 165 and an outlet 105' to and from valve 126, valve conduit 165', line 32 from the valve 126 to reservoir 33, relief valve 87, line 110, auxiliary reservoir 190, tying line 191 between reservoirs 33 and 190 with its vent opening 192 from auxiliary reservoir 190, outlet line 193 from reservoir 33 with a tie-in line 194 from reservoir 190, shut-off valve 90, oil strainer 91, line 39 from the reservoirs 33 and 190 to the pump 25, relief valve 82 communicating with high pressure line 31 and return line 39, outlet line 193 from reservoir 33, operating connection 93 between the high-pressure line 31 and the hydraulic throttle control (not shown), and universal joint assembly 92.

Relief valve 82 is for main pressure control and is located under the body platform 40 on the right hand side. Relief valve 87 is located in the right hand derrick support frame between the upper and lower restricted ports 36' and 35' of a cylinder 34. This relief valve 87 prevents overloading of the cylinders 34 if a load is applied to the derrick when the center leg 6 is not in a proper position. This valve 87 is adjusted only for derrick erection and nesting. Valve 82 can be adjusted for various loads so that the derrick will raise with these loads suspended from the center leg 6.

To elevate the derrick of live boom type, the truck clutch pedal is depressed and the power takeoff 27, Figure 19, is adjusted to put the hydraulic pump 25 in gear. The middle leg clamp or holddown assembly 106, Figure 17, attached to the left side leg 4 is then released. It is then made certain that sheave bar 20, Figure 4, is in place with an end of assist cable thereon. A snap which is at the other end of assist cable, and which in storage can be snapped to a pin (not shown), on the inside face of the left body side, is then engaged with an eyebolt keeper in the lower end of the middle leg cylinder 125, Figure 17. Then anchor bracket 13, Figures 2 and 3, is attached to the rear end of the truck platform 40' and the lower end of the middle leg cylinder 125 fitted in the socket and pivotally mounted on pin 24, Figures 1, 2, 3, or a special lever bolt may be provided dependent upon the operation which it is desired to perform with the derrick. This fitting of the lower end of the middle leg cylinder 125 is effected by pulling control lever 26 outwardly slowly and holding it until the lower end of the center leg cylinder 125 guided by the assist cable nears the bracket 13 on the truck platform 40'. Then the lever 26 is moved inwardly to a point where the speed of the derrick is slowed down and the center leg can easily be guided into position. Then the cross pin 24 is inserted through bracket 13 and a bottom hole in the center leg section 9. Then a spring-loaded keeper 127, Figure 17, snaps into a groove (not shown) of the pin 24.

To effect the adjustments of the center leg 6 by means of the center leg cylinder 125 for working operations of the live boom derrick, the flexible hose sections 136 and 137, Figure 9, are attached to outlets on the body frame work adjacent the left hand rear channel 11. This attaching is effected by quick-release shut-off couplings. Then the derrick head is raised to the desired height by pulling the plunger 150, Figure 26, outwardly by means of handle 28, which forces oil through line 136 into the top of center leg cylinder 125, thus extending the latter, since plunger 150 is linked to plunger 152. Then the handle 28 is allowed to return to neutral position and the derrick remains at the desired height and inclination since the oil is locked in the center leg cylinder 125.

By the inward and outward movements of the plunger 152 through the handle 28, the plunger 150 and the tie plate 146, the position of the derrick head can either be raised or lowered while the derrick is under load. The handle 26 is moved forwardly to erect the derrick and rearwardly to lower it. The handle 28 is moved forwardly to extend the cylinder 125 and lift the derrick head. When close positioning of the derrick head is desired, the handle 28 is moved slowly.

When the derrick is to be returned to nested position on the body roof, as shown in broken lines in Figure 1, the derrick is lowered to its lowermost position, and the reverse of the described erecting operations carried out.

If it is necessary to thread the winch cable 15 through the derrick head, the derrick is raised out over the rear of the body 2 with the center leg 6 clamped in position against the left side leg 4, and the derrick lowered to position G, Figures 1 and 9, where the head can be reached while standing on the ground. The line 15 is threaded in and the derrick then returned to nesting position, broken lines in Figures 1 and 9. Then the middle leg holddown assembly is unclamped and erection of the derrick effected as hereinbefore described.

When the derrick is being used for extremely heavy pulling, the center leg 6 is placed on the foot plate 21, Figures 1 and 9, with the center leg cylinder 125 completely telescoped thus providing a particularly stiff or firm center leg. If additional length of the stiff leg is required, an extension $6^2$, Figure 9, is attached to the lower end of the center leg 6.

Various modifications of the assemblage of elements comprising both the rigid tripod type of derrick and the live boom type can be made by the use of various accessories or alternate equipment to that hereinbefore described, for effecting special work operations by use of the winch line 15 and/or the center leg hydraulic cylinder 125, and, sometimes, by the use of special assist lines also. The structure of these accessories or alternate equipment, sometimes termed "adapters," is shown in the accompanying drawings and hereinafter fully described for a number of these special assemblages, as well as the types of operations effected by the different assemblages.

Some of these special assemblages are for on-and-off platform loading, one of which is illustrated in Figure 8 in connection with a standard type derrick. The derrick head has a maximum travel of about six feet for this type of operation. In the type of operation illustrated in Figure 8, the center leg 6 is pivotally secured forwardly in the truck body and the special assemblage of derrick parts is for the purpose of providing a resistance element which will be operative against any excessive forward movement of the derrick head. In this use of the derrick a center leg extension 72 has an upper tube section over which exteriorly telescopes the lower end of a lower section of the center leg 6, and at its lower end has a spring tube 76. This center leg extension 72 has its tube section 76 mounted on the body working floor 40 on an angle pad 74 secured forwardly on and at the center of floor 40, between the flanges 75 of which pad 74 on a pin 73' the base 73 of the tube 76 is pivotally mounted whereby derrick movement forwardly and rearwardly with derrick power is permitted for loading and unloading loads W on and from the body rear platform 40'. The tube 76 at its upper end extends into the leg section $6^2$, and the latter can assume upper, lower and intermediate positions, i.e., the center leg extension 72 provides as long a working length as possible with the leg section $6^2$. This result is effected by the aid of a compression spring which is based at its lower end upon an annular block (not shown) mounted above the base 73 and within the tube 76, the upper end of the spring abutting an annular block (not shown) welded to and surrounding a tube section contained within the leg section $6^2$.

Thus, provision is made, within the limits stated, for on and off platform loading by a telescoping extension 72 for the center leg 6, Figure 8, to accommodate the derrick head position that is desirable for the particular operation and to provide suitable resistance to any tendency, during the loading operation, of the derrick head to move forwardly in an excessive amount.

The structure just described is associated with the winch line 15, Figure 8, by a snatch block assembly having a sheave bracket for a winch line sheave, which bracket is pivotally secured to the extension base 73 by a universal joint clevis 142.

Another adapter kit modification is indicated in Figure 4, wherein the rear angle type anchor bracket 29 for the center leg has been positioned to the left side of the rear platform 40′ for operation of the standard type of derrick position "A" only, Figure 1, for a davit type of loading. This is the same type of anchor bracket as bracket 13 of Figures 1, 2 and 3.

In Figure 10 is illustrated a somewhat extreme lateral position of the center leg 6 in the live boom type of derrick. This shifting of the center leg 6 is made possible by the pivotal mounting at its top on the longitudinal pin 54, Figure 5. This position of the center leg 6 shown in Figure 10 is for the purpose of as close a positioning as is advisable to a pole end or stump 109 which it is desired to pull. Although this positioning and use of the center leg 6 is shown in live boom equipment, insofar as the actuating handle 28 is concerned, the center leg cylinder 125 is not utilized but a telescoping extension $6^2$ is substituted therefor and a standard use of the derrick is made with the winch line 15.

In Figure 14 the center leg has been moved forwardly and pivotally mounted in the center of the body 2 on an anchor bracket 149 for a lifting operation by a standard type of derrick. The center leg 6 is shown fully extended by means of an extension 170 which telescopes with an adjacently upper center leg section $6^4$. This assemblage permits lifting and lowering of loads W by the winch line 15 to and from an elevated platform or base located back of the truck.

In Figure 15 an assemblage for a davit type of operation with the live boom derrick is shown. This operation is effected with the center leg 6 on the left side of the rear platform 40′ and can be carried out through about seventy degrees of derrick travel. Derrick adjustment is effected by a center leg auxiliary single acting cylinder 125′ and the load is handled by an auxiliary sheave positioning. The auxiliary sheave 67 rotatable on pin 68 is carried by a cross bracket 69 positioned on and fastened to both derrick side legs 4 and 5, the sheave 67 passing the winch line 15 by which the weight or burden W is manipulated. For this operation the derrick center leg 6 is pivotally secured at its bottom end to an anchor bracket 144.

In Figure 15 a center leg coupling 139 is shown connecting the upper end of the center leg hydraulic cylinder 125′ and the lower end of an upper center leg section $6^3$.

The uses of the various types of adapter equipment hereinbefore described are not limited to the particular type of derrick mentioned, whether standard or live boom, since many of the adapters can be used with both types of derrick, although the use with a standard type of derrick may be of somewhat more limited scope than the use of the same adapter with a live boom type of derrick. The described uses are merely illustrative.

For stump or post pulling or other like operations some considerable distance laterally of the center line of the derrick support, the center leg 6 can be used much nearer the work by reason of its lateral pivotal movement on the longitudinal pin 54, Figures 5 and 6. This is illustrated, as hereinbefore described, in Figure 10. This is in addition to the lateral shifting of the center leg 6 incident to the storage of the derrick, and incident to its left side positioning both on the rear platform 40′ and forwardly in the body 2 for certain operations previously described.

Oftentimes it is desirable, in on-and-off loading, to move loads through an opening 95′ of a roof 95 of the body 2, Figure 28. The roof 95 has slideable sections so an opening 95′ can be provided. However, such a loading operation involves moving the derrick inwardly of a vertical position and provision must be made to prevent its moving down toward the body roof. A suitable structure for this purpose is shown in Figures 28, 29, 30 and 31. In this on-and-off platform loading operation the load W is manipulated by the winch line 15. The operation is mainly based on a special functioning of holding pins 94, Figures 30 and 31, which prevent the derrick moving too far forwardly from a central balanced vertical position when the erecting handle 26 is not being manipulated or held and the center leg control handle 28 is not effective. In this situation the pistons 37 of the side leg cylinders are free to float, as hereinbefore mentioned, and as is hereinafter fully described in detail.

In Figure 28 is illustrated in full lines what may be termed a balanced vertical position of the derrick; in the right-hand dotted line position a derrick pick-up position of the load W; and in the left-hand dotted line position an extreme forward load-depositing position. This extreme load-depositing position permits depositing of loads well forwardly on the body floor 40.

The structure shown in Figures 28, 29, 30 and 31, comprises blocks 71 mounted in the pivoted side leg sockets 7 and 8 and holding pins 94 secured in the socket supports 47. The structure shown is used for erecting the derrick preliminary to carrying out a loading operation, viz., transfer of burden W to or from a position forwardly on the support or body floor from or to a position rearwardly of the support or truck body. Reinforcing blocks 96 through which the pins 94 pass are welded to both faces of the inside socket supports 47. A brace 10 for the housing structure of the operating elements at the top of the side channels 11 and 12 is mounted forwardly on the working floor 40.

As the rotatable sockets 7 and 8 are turned inwardly or counterclockwise from vertical position, the blocks 71 which are substantially triangular in longitudinal section, as shown in Figure 30, and have forward base faces 71′ encounter the pins 94 and prevent further rotation of the sprockets 44 by the chains 42.

When the derrick has been moved counterclockwise by its erection cylinders 34 to balanced vertical position shown in full lines in Figure 28, the holding pins 94 are inserted and the center leg is properly extended so as to be secured forwardly upon the truck platform to reach and be pinned into an extension 197 which in turn is pinned to an anchor bracket 195′, for depositing of the load W in the desired position. At such time, of course, the center leg cylinder 125 is not effective for holding the derrick, and the pistons 38 of the side leg cylinders 34 are in a free floating condition, so that during this setting operation of the center leg the holding pins 94 are effective to hold the unstable side legs 4 and 5 upright and prevent the derrick falling forwardly upon the body roof. After the center leg has been properly positioned at its bottom end on the body floor bracket 195′ and pivotally fastened thereto, then the holding pins 94 are removed. Then the power is again turned on by the handle 28 and the loading operation is carried on by suitable manipulations of the center leg.

The pins 94 are secured to the bottom ends of chains 107 whose top ends are secured to the outer ends of the pivotal axis pins 46. When not in use the pins 94 are stored in brackets 185 mounted on the outer faces of the side channels 11 and 12.

As shown in Figure 29, the lower center leg part 197 has a flattened portion 196 which is pivoted on the anchor bracket 195′ mounted on a floor pad 195. Fixed to the leg part 197 is an eye rod 198 to which is pivotally connected one end of a bracket 200 rotatably carrying a sheave 199, the whole forming a snatch block assembly for the winch line 15.

For operation of either the standard or the live boom type of derrick the system is first filled with oil, with the operating plungers in neutral.

The movements of the standard type of derrick which are controlled by the valve 30, Figures 20, 21, and 22, are all the derrick movements and adjustments due to derrick erection, storage, and work effected by the derrick. How this valve control operates will now be described.

Referring particularly to said Figures 20, 21, and 22, the oil control valve 30 has an inner open-ended cylindrical operating spool or plunger 100 longitudinally slideable therein with an operating end extended from the rear end of the valve 30, which spool 100 is movable in both directions against the pressure of a compression spring 108 mounted in an inner end valve chamber 30'. Adjacent its outer operating end the spool 100 is formed with a peripheral recess 101 accommodating a sealing gasket 101'. The longitudinal movements or adjustments of the plunger 100 are effected by a horizontally-movable operating handle 26, Figure 16, engaging at its inner end the extending outer end of the spool 100, by double links 187, Figures 11, 12, 13, and 16, pivotally mounted on plunger pins 186 adjacent said inner handle end in a bracket 99' secured to a rear upstanding angle 99 mounted in the derrick frame work beneath the base 34' of the right hand double-acting derrick erection cylinder 34, Figure 16. Such a mounting serves for two handles 26 and 28, as shown in Figures 12 and 13, but only the handle 26 is required for the standard type of derrick.

The valve inlet port 102, Figure 21, into which the high pressure line 31 from the pump 25 leads, Figure 18, and the valve ports 104 and 124 leading to the top ends and bottom ends of the two cylinders 34 through oil lines 36 and 35, respectively, Figure 18, can communicate with a tubular portion 100', Figure 22, of the spool 100, through a system of peripheral spool recesses and other ports and passages hereinafter described. The ports 104 and 124 are both inlet and outlet valve ports to and from the double acting cylinders 34, depending upon whether the derrick is being raised or being lowered. An oil return outlet 105 from the valve 30 to the reservoir 33 via the line 32, Figure 18, is axially aligned with the spool 100 and communicates, through the open end 100² of the spool 100, with the end of the spool tubular portion 100' at the end of the valve 30 opposite to the outer operating handle end. The valve chamber 30' provides space for the play of the compression spring 108 against disks 112 and 112' mounted adjacent the chamber end walls. The inner end of the spool 100 which intersects chamber 30' is reduced in cross-section and has a central enlarged land portion 100³ which by contact with the disks 112 and 112' limits the inner and outer movements of the spool 100.

The position of the spool 100, shown in Figure 22, is a neutral or idling one in which the high pressure oil from the line 31 passes through the port 102, Figure 21, to a valve body passage 103, and thence through a plunger recess 120 and registering plunger through holes 123 to the tubular port 100' of the plunger 100 and through the latter directly to the reservoir line 32 through return port 105.

It is necessary to move the spool 100 longitudinally by the operating handle 26 in order to pass oil through the whole valve 30 to and from the double acting cylinders 34 via the ports 104 and 124.

For working flow of the oil through the valve 30 to the ports 104 and 124, leading to the cylinder lines 36 and 35, the spool 100 is formed with peripheral recesses 113 and 114, one on each side of the recess 120. These recesses 113 and 114 are of longitudinal extent greater than that of the recess 120 and, when the spool is moved inwardly or outwardly, can overlap the cross valve passage 103 and also the valve conduits 116 and 117 leading to the respective ports 104 and 124. Thus, when the plunger 100 is moved outwardly, the high pressure oil from the line 31 flows into recess 114 and thence by valve conduit 117 flows through port 124 and thence into the bottoms of the double acting cylinders 34 through the line 35. A return flow from the tops of the cylinders 34 through the lines 36 enters the valve 30 through the port 104 and flows through valve conduit 116 and then through peripheral recess 120 and holes 123 to the tubular part 100' of spool 100 and then out through return port 105.

If the plunger 100 is moved inwardly, the oil flow to and from the cylinders 34 is opposite to that just described, the oil entering the spool 100 from valve port 102 through peripheral recess 113, and oil returning to the plunger chamber 100' through valve conduit 117, peripheral spool recess 120, and spool holes 123. Oil pressure to the tops of the cylinders 34 through lines 36 and back from the bottoms of the cylinders 34 through lines 35 moves the derrick upwardly from storage position and outwardly of the rear of the truck body 2 for derrick work, and oil pressure to the bottoms of the cylinders 34 through lines 35 and back from the tops thereof through lines 36 moves the derrick inwardly of the truck body 2 and downwardly into storage position.

The movements of the live boom type of derrick which are controlled by the valve 126, Figures 23 to 27, comprise derrick erection and lowering, and manipulation of a center leg 6 by means of a double acting cylinder 125 which forms an extendable and telescoping part of that leg for such adjustments of the center leg as are necessary to perform the work desired of the derrick.

In the valve structure 126, shown in said Figures 23 to 27, an actuating plunger 151, Figures 23 and 27, for derrick erection and lowering, is of the same general design as the operating plunger 100 of the standard derrick, Figure 22. However, in this valve structure 126 the high pressure oil from the line 31, Figure 19, enters a valve port 165, Figure 25, and thence flows into a valve passage 165' intersecting the axis of a reciprocably-movable plunger 152, Figures 23, 24, and 27, which controls the double acting auxiliary cylinder 125 forming part of the derrick center leg 6, Figure 9. There is also a third reciprocably-movable plunger 150 mounted in this valve 126, an equalizing plunger, which is connected by a plate 146, Figures 23 and 24, to the center leg plunger 152 so as to move the latter concurrently with the movements of the plunger 150, except for some initial loose play of the plunger 152 on the inward and outward movements of the plunger 150 to preliminarily put the pistons 37 of the side leg cylinders 34 in position for floating when the center leg cylinder 125 is extended or telescoped, as will be hereinafter described. This loose play of the plunger 152 also keeps the pistons 37 of the side leg cylinders 34 in floating condition for a short period after the oil pressure is shut off from the center leg cylinder 125 on the return of the piston 152 to neutral. The actuating plunger 151 of the live boom control valve 126 can communicate with the equalizing plunger 150 through valve conduits 145 and 147, Figure 26. The center leg cylinder plunger 152, Figure 25, can communicate with the actuating plunger 151 by a circuitous passage which comprises a peripheral recess 161 in the plunger 152, a hole 162 through the plunger 152 communicating with the recess 161, a tubular part 152' of the plunger 152, a second hole 171 in the plunger 152 communicating with the tubular plunger part 152' and with a peripheral plunger recess 176, a recess 177 in the valve body 126 communicating with and surrounding the plunger recess 176, an inclined passage 180 in the valve body 126 and communicating with a valve passage 182 leading back to the plane of the axis of the valve passage entrance 165', whence by valve passage 183 communication is established with the desired peripheral recess in the operating plunger 151.

The center leg plunger 152 has other peripheral recesses 168 and 169, one on either side of the recess 161 and of a length sufficient, when moved in either direction, to overlap the valve passage 165' and either the port 174 or the port 175 leading to and from the center leg cylinder 125.

The equalizing plunger 150 has peripheral recesses 153, 154, 155, 163 and 164 and holes 156, 157, and 158 therethrough aligned with the recesses 153, 154, and 155, which holes 156, 157, and 158 communicate with a tubular part 150' of the plunger 150. The peripheral recess 163 is midway between the recesses 153 and 154, and the peripheral recess 164 is midway between the recesses 154 and 155.

The plungers 150, 151, and 152 each is formed at its inner end with a land 100³ on a reduced end portion and provided with springs 108 and spring abutment disks 112 and 112' similar to those described with reference to the standard derrick operating plunger 100. However, the inner end of the plunger 152 is closed by a plug 181. The open end 150² of the plunger 150 discharges into a rear chamber 128 of the body of the valve 126 whence the oil flow is via return port 105' to reservoir line 32.

The recesses of the plungers of the valve 126, as shown in Figures 23 to 27, are in neutral or idling position and, for this position, the oil flow from the high pressure line 31 is through port 165, valve conduit 165', thence through recess 161, plunger hole 162, thence through the tubular part 152' of plunger 152 to hole 171, plunger recess 176, valve body recess 177, valve offset conduit 180, valve return passage 182 to valve passage 183, to recess 120 and holes 123 of the operating plunger 151, and thence through tubular part 151' of plunger 151 and out of the return port 105' to reservoir line 32.

When it is desired to erect or lower the derrick of the live boom type, the plunger 151 is moved inwardly or outwardly by the handle 26 so as to effect communication between valve port 145 and valve conduit 165' or valve port 147 and valve conduit 165'. This is effected by communication between recess 113 and passage 145 and passage 183, or by communication between recess 114 and passage 147 and passage 183. Thus for these derrick raising and lowering operations, the oil flow toward the cylinders 34 must first reach the recess 113 or the recess 114 of the operating plunger 151. This is effected by the circuitous route hereinbefore described from the valve port 165, Figure 25, to operating plunger 151. Since the plunger 151 has been moved inwardly or outwardly, the recess in plunger 151 to which the oil is fed will be recess 113 or recess 114 depending upon whether the derrick is to be raised or lowered. Then the oil flows by valve conduit 145 and recess 163, or valve conduit 147 and recess 164, to either valve port 104 or valve port 124. The discharge of the oil returning from the cylinders 34 to the port 124 or port 104 is by recess 164 in plunger 150, valve conduit 147, recess 120, and holes 123, or by recess 163, valve conduit 145, recess 120, and holes 123, to the tubular part 100' of operating plunger 151, and thence out the return port 105'.

For the adjustments of the center leg 6 to effect the working operations of the derrick, the plunger 152 is moved inwardly or outwardly to pass oil through the valve ports 175 and 174 to oil lines 136 and 137, Figure 19, to the top and bottom of the cylinder 125, Figure 19, whereby the latter is extended or is telescoped into collapsed condition. Oil passed through line 136 to the top of cylinder 125 extends the latter and oil passed through line 137 to the bottom of cylinder 125 telescopes it.

Since the center leg plunger 152 is linked to plunger 150, and since operating handle 28, Figures 11, 12 and 13, controls plunger 150, both the plungers 150 and 152 are moved by handle 28.

A movement of the plunger 150 outwardly to effect registration of recess 155 with port 124 and of recess 154 with port 104 does not provide for any oil passage between plungers 151 and 150 because recess 114, and recess 113 in plunger 151 are shut off since plunger 151 is in a neutral position, Figure 26. Likewise a movement of the plunger 150 inwardly to effect registration between recess 153 and port 104 and registration of recess 154 with port 124 does not provide for any oil passage between plungers 151 and 150 because these same recesses 113 and 114 are shut off. Therefore, any raising or lowering of the derrick head as a result of the manipulation of the center leg by the plunger 152 will result in the pistons 37 of side leg cylinders 34 floating by reason of oil passing from one end of cylinders 34 to the other ends of those cylinders through ports 104 and 124 and recesses 153, 154, 155, holes 156, 157, and 158, and tubular part 150' of plunger 150.

During the inward or outward movement of the plunger 150, the linkage 146 has caused conduit 165' to be overlapped by either recess 168 of plunger 152 or recess 169 of plunger 152, so that oil thus flows to and from the center leg cylinder 125 by the ports 174 and 175.

If, while effecting work by the derrick through the manipulations of the center leg 6, it is necessary to lower the derrick, this is done by telescoping the center leg cylinder 125 inwardly by moving the plunger 150 inwardly which moves the plunger 152 inwardly. This action, by reason of the lowering of the derrick head, results in oil flowing out of the bottoms of the side leg cylinders 34 and into the tops of those cylinders 34 or, in other words, a transfer of oil through the port 124, recess 154, hole 157, tubular chamber 150', hole 156, recess 153 to port 104. It also results in moving recess 168 of plunger 152 into overlapping relation with valve conduit 165', and port 174, and recess 161 and hole 162 into registration with port 175. Thus oil flows through line 137 to the bottom of cylinder 125 and through line 136 out of the top of the cylinder 125.

However, the tops of the cylinders 34 cannot accommodate all the oil that flows out of the bottoms of those cylinders, because the cylinder piston stems 38 which play through the tops of cylinders 34 displace considerable oil. The excess oil thus resulting passes out of tubular part 150' of plunger 150, through chamber 128 and out return port 105' and thence to reservoir 33 by line 32.

The extending of the center leg cylinder 125 results in actions the reverse of what has been described except that in this case, when the oil is flowing through the plunger 150 from port 104 to 124 by reason of the pistons 37 of the cylinders 34 moving outwardly, there is more oil required in the bottoms of the cylinders 34 than is furnished from the tops thereof. This deficiency of oil for the cylinder bottoms is aspirated into the bottoms of the cylinders 34 from the reservoir 33 by the line 32, the chamber 128, the chamber 150', the hole 158, recess 155, and port 124.

It has been mentioned that the plunger 152 has a certain amount of free play or lost motion by reason of the spacing 166 of both sides of one end of the link 146, Figure 23, from the plunger 152. This results in the prevention of bending stress being exerted upon the side legs 4 and 5 during the raising or lowering of the derrick head. This is so because the plunger 152 on movement from neutral position to inward or outward position somewhat follows the plunger 150 and on the movement from inward or outward position to neutral position somewhat precedes it. In other words, the commencing movement of the plunger 152 later than the movement of the plunger 150 in going from neutral position to inward or outward position allows the pistons 37 of the side leg cylinders 34 to assume a free floating position before plunger 152 allows movement of the center leg cylinder 125, and likewise the latter closing movement of the plunger 150 on the movement of the plunger 152 from inward or outward position to neutral position allows the pistons 37 of the side leg cylinders 34 to remain free to float for a short period after the plunger 152 has ceased to allow center leg movement. It will be remembered that the plunger 151 controls flow of oil to and from the derrick erecting and lowering cylinders 34 and that the relief valve 82, Figure 19, which is located under the working floor 40, is effective when all ports and passages are closed and the pump 25 is running. The pump 25 runs continuously during erection and lowering and during derrick use.

Thus, when the plunger 150 is moved inwardly by the handle 28 and the plunger 152 is moved inwardly, by reason of the linkage 146 between the plungers 150 and 152, registration of recess 168 with conduit 165' is effected somewhat after the registration of recess 153 and hole 156 and port 104 and the registration of recess 154, hole 157 and port 124. During this inward movement of the plungers 150 and 152, plunger 152 is behind plunger 150 to the extent of the dimension of the space 166 since link 146 at the beginning of the movement moves freely along plunger 152 to that extent. It will be remembered that recess 168 can overlap both port 174 and conduit 165'. Therefore, oil starts to flow through port 174 to the bottom of center leg cylinder 125 and out from the top of center leg cylinder 125 somewhat after recess 153 and hole 156 register with port 104, and recess 154 and hole 157 register with port 124. Thus, the pistons 37 of the side leg cylinders 34 are placed in free floating position before there is a flow of oil to the bottom of the center leg cylinder 125. It should also be remembered that during these actions actuating plunger 151 is in neutral position and that in this position recess 120 and holes 123 are shut off, whether equalizing plunger 150 is in neutral position or in inner position or in outer position. The center leg adjustment thus effected provides a new setting of the derrick head and, while this is taking place, the pistons 37 of side leg cylinders 34 are free to float.

When the handle 28 allows the return of the plungers 150 and 152 to neutral positions, Figures 25 and 26, the plunger 152 which has not been moved inwardly as far as the plunger 150 by the amount of the space 166, and moves outwardly immediately with the plunger 150, since the link 146 is in contact with the outer face of the body of the plunger 152, moves ahead of the plunger 150 until it reaches neutral position, Figure 25. During this outward movement recess 168 and valve conduit 165' lose registration somewhat in advance of the loss of registration between recess 154, hole 157 and port 124, and loss of registration between recess 153, hole 156, and port 104. Therefore, on this return movement oil flow is shut off to and from the center leg cylinder 125 through the ports 174 and 175 before it is shut off between port 104, recess 153 and hole 156 and between port 124, recess 154 and hole 157.

If the plunger 152 is moved outwardly by the movement of plunger 150, by reason of plate 146, the movement of plunger 152 again lags behind the movement of plunger 150 somewhat. Again, on the return when moving from extreme outward position to neutral position, plunger 152 somewhat precedes plunger 150. Under these conditions recess 169 of plunger 152 is the overlapping one with port 175 and conduit 165', and recess 161, hole 162 and port 174 register. Also in plunger 150 the registration is between recess 154, hole 157 and port 104, also registration of recess 155, hole 158, and port 124. Therefore, the free floating positions of pistons 37 allowed by the above-described movements of the plungers 150 and 152, first, prior to movement of oil in the center leg cylinder and, secondly, subsequent to the movement of oil in the center leg cylinder, prevent any bending stresses being applied to the side legs 4 and 5 that might be caused by the change of the head position of the derrick due to movements of the center leg cylinder 125.

What we claim is:

1. A derrick provided with a support and having two upwardly-converging side legs and a center leg all pivotally mounted adjacent their lower ends on the support, the center leg being removably pivotally mounted, and a head for the derrick having a bracket, a pin in the bracket to which the upper ends of the side legs are secured, the bracket being pivotally movable on the pin relative to the side legs, a set of pin hangers depending from the bracket, a set of upwardly-projected pin hangers on the center leg, and a hinge pin mounted in said sets of hangers, the axis of said hinge pin being normal to the axis of the first-mentioned pin.

2. A truck body, a derrick mounted thereon, said derrick comprising erection and supporting upwardly-converging side legs pivotally mounted adjacent their lower ends on the body, a center leg removably pivotally mounted adjacent its lower end on the body, and a head for the derrick having a bracket, a cross pin in the bracket to which the upper ends of the two side legs are secured, the bracket being pivotally movable on the pin longitudinally of the body, a set of pin hangers depending from the bracket, a set of upwardly-projected pin hangers on the center leg, and a longitudinal hinge pin for the center leg mounted in said sets of hangers.

3. An upper end derrick structure comprising side leg sections spaced apart at their upper ends, and a pin secured to said section ends, and a derrick head, said head comprising a bracket pivotally mounted on said pin between the leg sections, a hinge pin whose axis is normal to the axis of the first-mentioned pin, a center leg section pivotally depending from said hinge pin, a sheave rotatably mounted in the center leg section and extending therefrom, opposed plates secured to the top of said center leg section and depending therefrom, the hinge pin being loosely retained in said bracket and plates, and means retaining the plates disposed adjacent the exterior faces of the sheave.

4. An upper end derrick structure, characterized as in claim 3, in which there is a depending insert secured to and interiorly of the center leg section and extending below the latter for incorporation with the upper end of a center leg, in which the sheave is also rotatably mounted in said insert and extends therefrom, in which the opposed plates are also secured to the top of said insert and depend therefrom, in which there are rollers laterally offset from the plane of the sheave, and in which there are means for mounting the rollers on the center leg section.

5. A derrick having a pair of upwardly-converging side legs and a center leg pivotally secured adjacent its top to the side legs, double acting hydraulic cylinders for the side legs and pistons for the cylinders, controllable means selectively supplying oil pressure to and withdrawing it from either end of the cylinders, means connecting the pistons to the side legs to erect and store the derrick, a double acting hydraulic cylinder for the center leg and a piston therefor, controllable means selectively supplying oil pressure to either end of the last-mentioned cylinder, a single valve for the controllable means supplying the oil pressure to the various cylinders, and conduit means cooperative with the last-mentioned controllable means supplying oil to the center leg cylinder to move the center leg piston to adjust the center leg, the valve having conduits and controls therefor transferring oil from one end of each side leg cylinder to the other end thereof during the adjustments of the center leg in one direction, and transferring oil from the "other end" of each side leg cylinder to the "one end" thereof during adjustments of the center leg in the other direction.

6. A derrick having a pair of upwardly-converging side legs and a center leg pivotally secured adjacent its top to the side legs, hydraulic cylinders for the side legs and pistons for the cylinders, controllable means selectively supplying oil pressure to and withdrawing it from the cylinders, means connecting the pistons to the side legs to erect and store the derrick, an hydraulic cylinder for the center leg and a piston therefor, controllable means selectively supplying oil pressure to the last-mentioned cylinder, a single valve for the controllable means supplying the oil pressure to the various cylinders, and conduit means cooperative with the controllable means supplying oil to the center leg cylinder to move the center leg piston to adjust the center leg, the valve having conduits and controls therefor transferring oil in both directions to and from each side leg cylinder to effect the adjustments of the center leg, such conduits and controls being interrelated with the means supplying oil pressure to the various cylinders to effect a free floating of the pistons of the side leg cylinders during the adjustments of the center leg, said interrelation being such that the oil flow to the center leg cylinder commences subsequent to a free floating condition created for the pistons of the side leg cylinders, and in which the shut-off of oil effecting the adjustments of the center leg is effected in advance of the termination of the free floating condition created for the pistons of the side leg cylinders.

7. A derrick provided with a support upon which the derrick is stored, the derrick having upwardly-converging supporting side legs pivotally connected adjacent their lower ends to the support, said side legs being connected together adjacent their top ends, a center leg comprised of telescoping sections and permanently attached to and pivotally depending from the top ends of the side legs, means for selectively adjusting the telescoping sections of the center leg, means providing lateral pivotal movement of the center leg relative to the side legs, a transverse bar removably mounted on the side legs, upon which bar the center leg rests in the storage position of the derrick, an anchor bracket removably securable to the support in one of selective discriminate lateral locations, to which bracket the lower end of the center leg is removably pivotally securable, and power means for the side legs for erecting the derrick from storage position to a working position beyond the plane of an end of the support, whereby, when the power means is activated to erect the derrick, the center leg is integrally and automatically erected therewith to a stiff working position.

References Cited in the file of this patent
UNITED STATES PATENTS

| | | |
|---|---|---|
| 868,032 | Thomson | Oct. 15, 1907 |
| 1,399,092 | Thoresen | Dec. 6, 1921 |
| 1,699,480 | Snow | Jan. 15, 1929 |
| 1,817,859 | Cohen-Venezian | Aug. 4, 1931 |
| 1,858,774 | Hansen | May 17, 1932 |
| 1,874,007 | Heaton | Aug. 30, 1932 |
| 2,196,649 | Waite | Apr. 9, 1940 |
| 2,225,588 | Gartin | Dec. 17, 1940 |
| 2,257,873 | Troche | Oct. 7, 1941 |
| 2,336,965 | Shoemaker | Dec. 14, 1943 |
| 2,353,655 | Day | July 18, 1944 |
| 2,538,969 | Kessler | Jan. 23, 1951 |
| 2,550,185 | Busch | Apr. 24, 1951 |
| 2,558,119 | Young | June 26, 1951 |
| 2,598,517 | Drott | May 27, 1952 |
| 2,611,580 | Troche et al. | Sept. 23, 1952 |
| 2,636,717 | Powers | Apr. 28, 1953 |
| 2,687,810 | Hurst | Aug. 31, 1954 |
| 2,838,182 | Brown | June 10, 1958 |